United States Patent

Jia et al.

(10) Patent No.: US 9,313,063 B1
(45) Date of Patent: Apr. 12, 2016

(54) APPARATUS AND METHOD FOR TRANSMITTING DATA WITH CONDITIONAL ZERO PADDING

(71) Applicants: Ming Jia, Ottawa (CA); Jianglei Ma, Ottawa (CA); Wen Tong, Ottawa (CA)

(72) Inventors: Ming Jia, Ottawa (CA); Jianglei Ma, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/610,277

(22) Filed: Jan. 30, 2015

(51) Int. Cl.
*H04K 1/02* (2006.01)
*H04L 25/03* (2006.01)
*H04L 25/49* (2006.01)
*H04L 27/26* (2006.01)

(52) U.S. Cl.
CPC ...... *H04L 27/2605* (2013.01); *H04L 25/03006* (2013.01)

(58) Field of Classification Search
CPC ................. H04L 27/2605; H04L 25/03006
See application file for complete search history.

(56) References Cited

U.S. PATENT DOCUMENTS

| | | | |
|---|---|---|---|
| 2005/0219998 | A1 | 10/2005 | Kumar et al. |
| 2006/0233269 | A1 | 10/2006 | Bhushan |
| 2010/0080266 | A1* | 4/2010 | Zhang et al. .......... 375/140 |
| 2011/0158342 | A1* | 6/2011 | Srinivasan et al. ..... 375/285 |
| 2011/0249709 | A1* | 10/2011 | Shiue et al. .......... 375/219 |
| 2013/0028346 | A1* | 1/2013 | Hottinen .......... 375/285 |
| 2014/0355626 | A1* | 12/2014 | Fechtel .......... 370/474 |

FOREIGN PATENT DOCUMENTS

CN 101478519 A 7/2009

OTHER PUBLICATIONS

Andrews, J.G., What Will 5G Be?, IEEE JSAC Special Issue on 5G Wireless Communication Systems, May 12, 2014, pp. 1-17.
Berardinelli, G., On the potential of OFDM enhancements as 5G waveforms, IEEE VTC, Feb. 2014, 5 pages.
Institute for Information Industry (III), Coiler Corporation, DL Frame Timing in Carrier Aggregation, 3 Gpp TSG-RAN NG1 #62, vol./, No./, Aug. 27, 2010, pp. 1 to 4.
International Search Report and Written Opinion PCT/182015/058713, dated Feb. 18, 2016, pp. 1-11.

* cited by examiner

*Primary Examiner* — Erin File (57) ABSTRACT

An apparatus and method for transmitting data with conditional zero padding is provided. In accordance with an embodiment of the disclosure, a transmitter transmits data to a receiver by transmitting symbols such that each symbol is preceded by a cyclic prefix of a fixed length and the symbol conditionally includes enough zero padding to avoid ISI (Inter-Symbol Interference) between consecutive symbols. In some implementations, if the fixed length for cyclic prefixes is long enough to avoid ISI between consecutive symbols, then the symbols may omit zero padding. Otherwise, the symbols may include enough zero padding to avoid ISI between consecutive symbols. The zero padding may be zero tail or zero head.

35 Claims, 11 Drawing Sheets

```
┌─────────────────────────────────────┐
│  Determine that the cyclic prefix   │
│  length of a symbol is not long     │
│  enough to prevent ISI between      │
│         adjacent symbols            │
│                202                  │
│  ┌───────────────────────────────┐  │
│  │   Estimate channel delay      │  │
│  │        spread (CDS)           │  │
│  │            206                │  │
│  └───────────────────────────────┘  │
│                 │                   │
│                 ▼                   │
│  ┌───────────────────────────────┐  │
│  │     Use estimated CDS in      │  │
│  │        determination          │  │
│  │            208                │  │
│  └───────────────────────────────┘  │
└─────────────────────────────────────┘
                  │
                  ▼
┌─────────────────────────────────────┐
│ Insert zero padding into one of the │
│      symbols to mitigate ISI.       │
│                204                  │
│                 │                   │
│                 ▼                   │
│  ┌───────────────────────────────┐  │
│  │    Add zeros to the end       │  │
│  │  (tailing zeros) of the bits  │  │
│  │   allocated to the symbol     │  │
│  │            210                │  │
│  └───────────────────────────────┘  │
└─────────────────────────────────────┘
```

APPARATUS AND METHOD FOR TRANSMITTING DATA WITH CONDITIONAL ZERO PADDING

FIELD OF THE DISCLOSURE

This application relates to wireless communication, and more particularly to transmitting data with conditional zero padding.

BACKGROUND

When a transmitter transmits a signal to a receiver, the transmission might travel over more than one path to the receiver due to diffraction and/or reflection off of objects in the surrounding environment. The signal travelling over the longest path will arrive at the receiver after the signal travelling over the shortest path. This delay is known as channel delay spread. If the channel delay spread is not accounted for, then there may be ISI (Inter-Symbol Interference) between consecutive symbols, which can make it difficult or even impossible to recover the data at the receiver.

SUMMARY OF THE DISCLOSURE

An apparatus and method for transmitting data with conditional zero padding is provided. In accordance with an embodiment of the disclosure, a transmitter transmits data to a receiver by transmitting symbols such that each symbol is preceded by a cyclic prefix of a fixed length and the symbol conditionally includes enough zero padding to avoid ISI between consecutive symbols. The zero padding may be zero tail or zero head.

In some implementations, if the fixed length for cyclic prefixes is long enough to avoid ISI between consecutive symbols, then the symbols may omit zero padding. Otherwise, the symbols may include enough zero padding to avoid ISI between consecutive symbols. In specific implementations, the symbols include an amount of zero tail so that a length of the zero tail in addition to the fixed length of the cyclic prefixes is greater than or equal to a channel delay spread for transmitting data to the receiver.

According to another embodiment of the disclosure, if a transmitter determines that a cyclic prefix length associated with symbols in a transmission is insufficiently long to prevent ISI between adjacent symbols, then the transmitter inserts zero padding into at least one of the symbols to mitigate the ISI. The zero padding may involve inserting zero tail into fixed length symbols.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

INTRODUCTION

Figure 1:
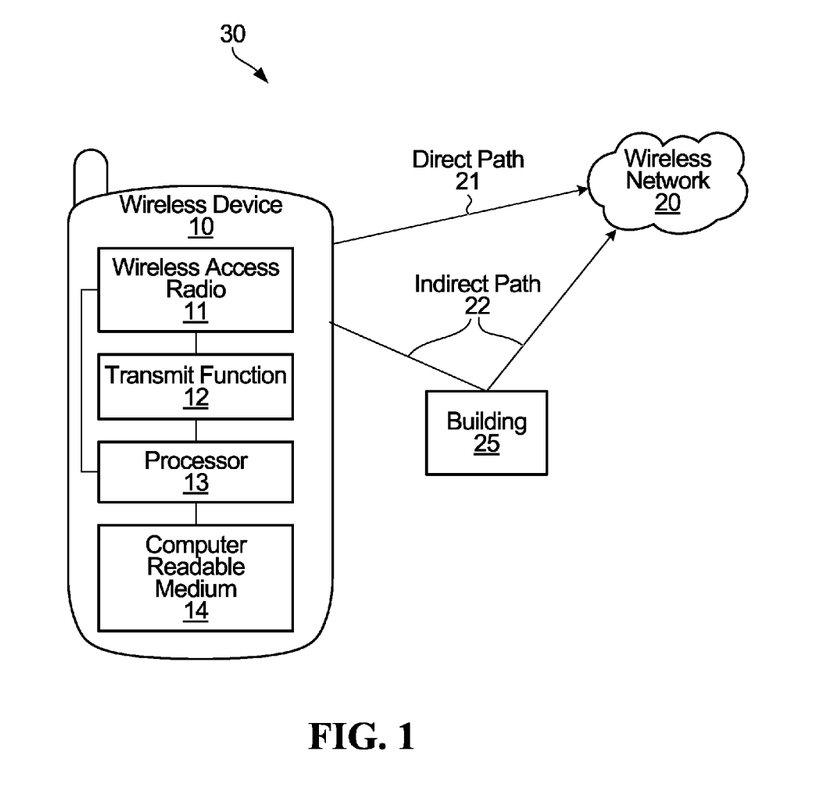
FIG. 1 is a schematic of a wireless system featuring a wireless device and a wireless network, in accordance with an embodiment of the disclosure.

Referring first to FIG. 1, shown is a schematic of a wireless system 30 featuring a wireless device 10 and a wireless network 20. The wireless device 10 has a wireless access radio 11, circuitry implementing a transmit function 12, a processor 13, a computer-readable medium 14, and may have other components that are not specifically shown. The wireless system 30 may have many other wireless devices in addition to the wireless device 10, but they are not specially shown. The wireless network 20 has wireless components that are not specifically shown. Note that the wireless network 20 may include wired components even though the wireless network 20 is described as being wireless. The wireless network 20 is deployed in an environment in which there may be some obstacles, for example a building 25 or other obstacles not specifically shown.

Operation of the wireless system 30 will now be described by way of example. The wireless device 10 is capable of communicating with the wireless network 20 using the wireless access radio 11. Such communication may for example involve email, text messaging, telephony, web browsing, etc. Since the communication is wireless and there may be various obstacles such as the building 25, transmission from the wireless device 10 may include more than one transmission path 21, 22. In the illustrated example, transmission from the wireless device 10 to the wireless network 20 includes a direct path 21 and an indirect path 22 caused by reflection off the building 25. Since the indirect path 22 is longer than the direct path 21, the transmission following the indirect path 22 arrives at the wireless network 20 later than the transmission following the direct path 21. The delay between the transmissions over the transmission paths 21, 22 is known as channel delay spread. If the channel delay spread is not properly accounted for, then there may be ISI (Inter-Symbol Interference) between consecutive symbols that may make it difficult or even impossible to recover the data.

In accordance with an embodiment of the disclosure, the wireless device 10 has circuitry implementing the transmit function 12 with the wireless access radio 11 for transmitting data in a manner that reduces the likelihood of ISI. In particular, the transmit function 12 operates to transmit symbols such that each symbol is preceded by a cyclic prefix of a fixed length and the symbol conditionally includes enough zero padding to avoid ISI between consecutive symbols. The zero padding may be zero tail or zero head as described in further detail below. In some implementations, the amount of zero tail or zero head is communicated to the receiver to facilitate recovery of the transmitted data at the receiver.

There are many possibilities for implementing the wireless device 10. The wireless device 10 might be a mobile terminal such as a tablet, smartphone, vehicle phone, etc. Alternatively, the wireless device 10 might be a fixed terminal and/or form part of a machine or a home appliance such as a refrigerator. Note that the wireless system 30 may have a mix of mobile terminals and fixed terminals.

There are many possibilities for the circuitry implementing the transmit function 12 of the wireless device 10. In some implementations, the circuitry includes the processor 13, which is configured to implement the transmit function 12 when instructions recorded on the computer-readable medium 14 are executed by the processor 13. In other implementations, the circuitry includes a DSP (Digital Signal Processor), an FPGA (Field Programmable Gate Array), an ASIC (Application Specific Integrated Circuit) and/or a microcontroller. More generally, the circuitry implementing the transmit function 12 includes any appropriate combination of hardware, software and firmware.

There are many possibilities for the wireless access radio 11 of the wireless device 10. In some implementations, the wireless access radio 11 includes a receiver and a transmitter. The receiver may be coupled to a receive antenna while the transmitter is coupled to a transmit antenna. In some implementations, the wireless access radio 11 includes more than one receiver and more than one transmitter. The transmitter(s) and receiver(s) may be coupled to a processing unit, for example a DSP, for processing signalling.

Although the illustrated example described above with reference to FIG. 1 focuses on transmission from the wireless device 10, it is to be understood that embodiments of the disclosure are also applicable to transmission from a network node (e.g. base station) of the wireless network 20. In such alternative implementations, the network node would possess a transmit function similar to the transmit function 12 of the wireless device 10. More generally, embodiments of the disclosure are applicable to any appropriate transmitter, regardless of whether the transmitter is a wireless device or a network node of a wireless network.

Figure 2:
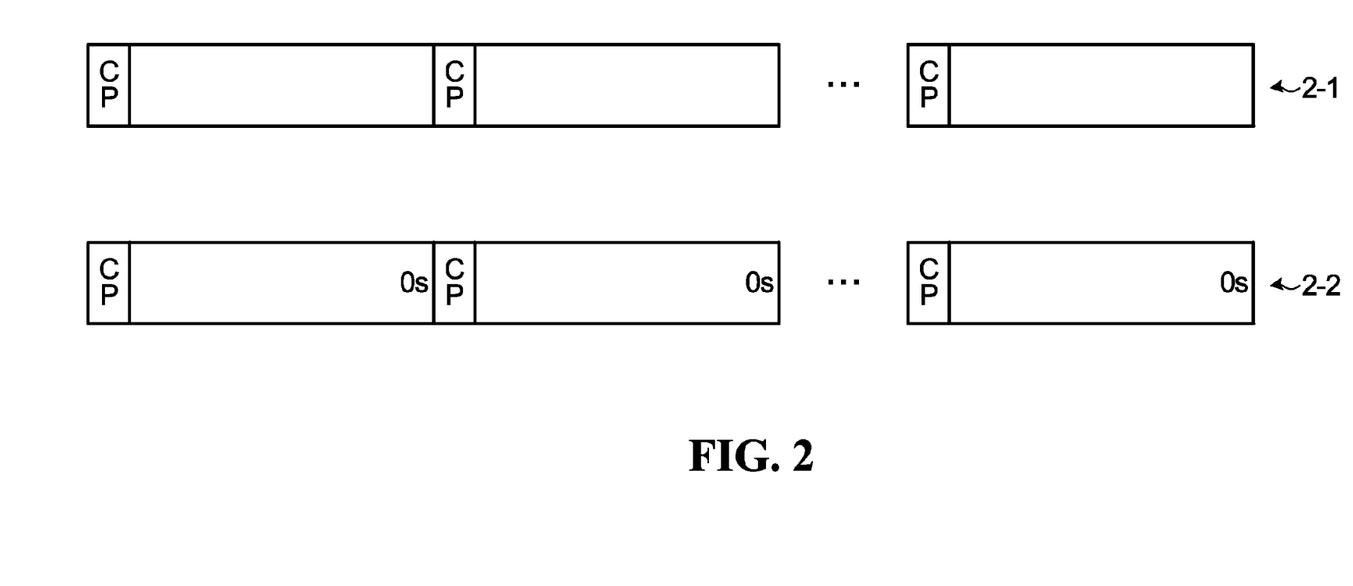
FIG. 2 is a schematic representing formats of data that may be transmitted by the wireless device of FIG. 1.

Referring now to FIG. 2, shown is a schematic representing formats of data that may be transmitted by the transmit function 12 of the wireless device 10. As shown at 2-1, the wireless device 10 may transmit symbols such that each symbol is preceded by a cyclic prefix of a fixed length. For each symbol, the cyclic prefix is a copy of the end of the symbol and is positioned before the symbol. The fixed length is a time value (i.e. measured in seconds) and is equal to a number of samples taken from the end of the symbol divided by a sampling rate. In situations in which the channel delay spread is less than the fixed length of the cyclic prefixes, then the wireless device 10 may rely on the cyclic prefixes as shown at 2-1 to avoid ISI between consecutive symbols. This is because the cyclic prefixes are long enough to avoid adjacent symbols from overlapping due to the channel delay spread. However, if the channel delay spread is greater than the fixed length of the cyclic prefixes, then the wireless device 10 pads the symbols with zeros as shown at 2-2. The zero padding can be zero tail (i.e. zeros padded at the end of each symbol) as shown, or alternatively zero head (i.e. zeros padded at the beginning of each symbol). The zero padding is not designed to replace the cyclic prefixes, but to compensate for cyclic prefixes that are insufficient for avoiding ISI. The zero padding forms part of the symbols, which means that symbols may contain less data when there is zero padding.

In some implementations, the amount of zero padding is chosen so that a length of the zero padding in addition to the fixed length of the cyclic prefixes is greater than or equal to the channel delay spread. This enables ISI to be avoided. Note that the length of zero padding for a transmitted symbol is a time value (i.e. measured in seconds) and may have discrete values based on how many zeros are present, as the number of zeros are whole numbers as explained in further detail below with reference to FIG. 9. In specific implementations, the zero padding is chosen as a minimum amount of zero tail to avoid ISI between consecutive symbols. Introducing further zero padding is possible, but this is unnecessary and results in greater overhead and less data per symbol. Note that when the length of zero tail is less than the fixed length of cyclic prefixes, the cyclic prefixes will contain non-zero samples that can be used for assisting synchronization. However, when the length of zero tail is greater than the fixed length of cyclic prefixes, the cyclic prefixes will contain zeros from the zero tail.

Embodiments of the disclosure refer to conditionally including zero tail or zero head to "avoid ISI" between consecutive symbols. It is to be understood that avoiding ISI generally means that all problematic ISI is evaded. However, it is possible that some benign ISI, which may not even be detectable, may remain. Problematic ISI means ISI that has a meaningful effect on recovering the data. Problematic ISI can make it difficult or even impossible to recover the data. Benign ISI generally means ISI that has no meaningful effect on recovering the data. No special considerations are required for dealing with benign ISI. ISI may be avoided between a first symbol and a subsequent symbol when most energy from the first symbol, due to channel delay spread, falls within the cyclic prefix of the subsequent symbol, rather than reaching the body of the subsequent symbol. It should also be noted that embodiments of the disclosure can be used to mitigate but not eliminate problematic ISI. For example, some embodiments may be implemented so that only a percentage of the problematic ISI is eliminated.

Figure 3A:
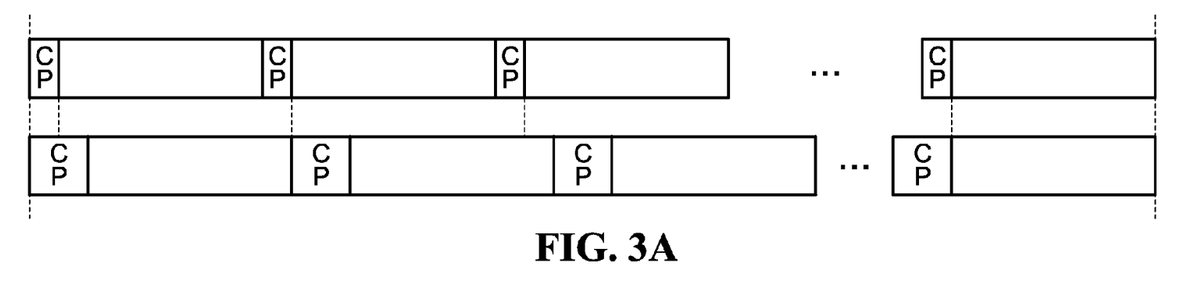
FIGS. 3A and 3B are schematics representing alternative formats of data for comparison.
Figure 3B:
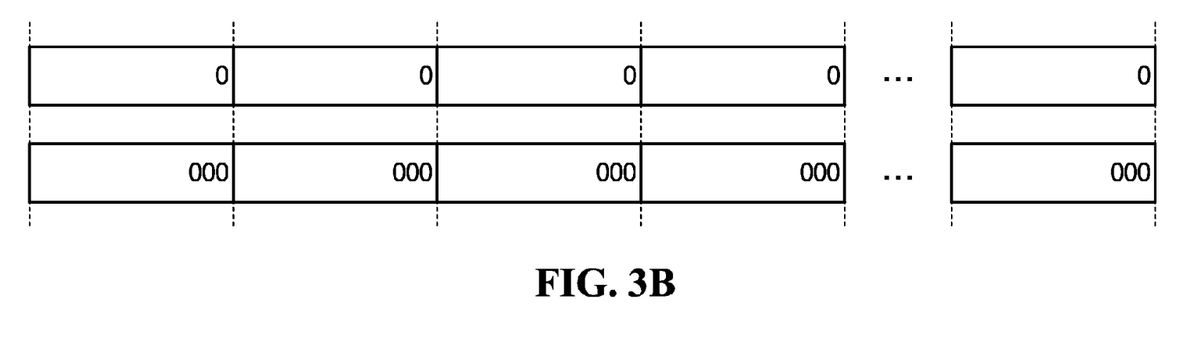

The fixed length of the cyclic prefixes is relatively small so that there is a relatively small overhead, for example 7%, but of course other fixed lengths are possible. The fixed length is a time value that may be predetermined and does not change over time. Furthermore, the symbols also have fixed length, which allows the format of data shown at 2-1 and the format of data shown at 2-2 to share the same alignment. Sharing the same alignment can be advantageous from a system design perspective, for example because neighbouring base stations may be synchronized and use the same system parameters such as sub-carrier spacing. This may greatly reduce complexity of the wireless system 30. Note that this alignment would not be possible if the cyclic prefixes were allowed to have variable length while the symbols maintain constant length as shown in FIG. 3A. Omitting cyclic prefixes altogether and relying on zero padding as shown in FIG. 3B could allow alignment. However, omitting the cyclic prefixes is not desirable because the cyclic prefixes are useful for time-domain synchronisation. Also, if the overhead granularity for zero padding is relatively large, for example 8.3% in the case of 12 subcarriers, then total overhead may be larger than needed.

Methods for Transmitting Data

Figure 4:
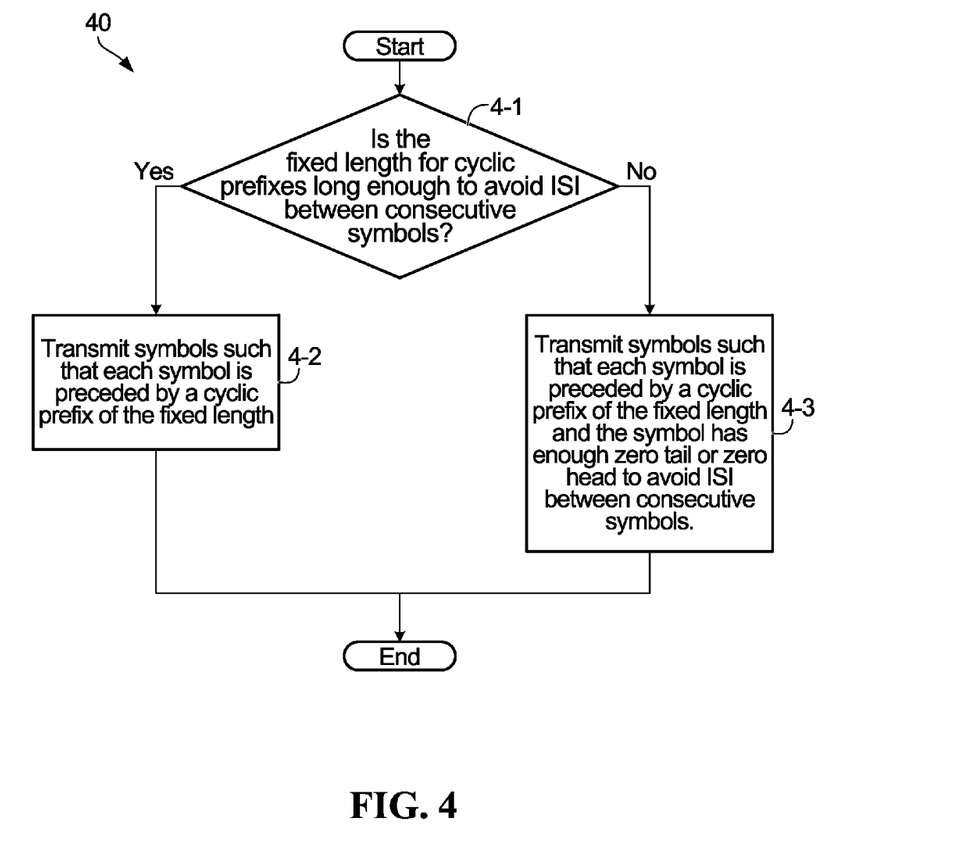
FIG. 4 is a flowchart of a method for transmitting data based on a channel delay spread, in accordance with an embodiment of the disclosure.

Referring now to FIG. 4, shown is a flowchart of a method for transmitting data based on a channel delay spread. This method may be implemented by a transmitter, for example by the transmit function 12 of the wireless device 10 shown in FIG. 1. Alternatively, this method may be implemented by a network node (e.g. base station) of a wireless network. More generally, this method may be implemented by any appropriate transmitter.

The method starts under the presumption that the transmitter is to transmit data to a receiver and the transmitter is aware of the channel delay spread for transmitting the data to the receiver. At step 4-1, based on the channel delay spread for transmitting data to the receiver, the transmitter determines whether a fixed length for cyclic prefixes is long enough to avoid ISI between consecutive symbols. For example, the transmitter may determine that the fixed length for cyclic prefixes is sufficient for avoiding ISI between consecutive symbols only if the fixed length for cyclic prefixes is equal to or longer than the channel delay spread. Since the fixed length for cyclic prefixes and the channel delay spread are both time values measured in seconds, they may be compared to one another.

If the fixed length for cyclic prefixes is long enough to avoid ISI between consecutive symbols, then at step 4-2 the transmitter transmits symbols such that each symbol is preceded by a cyclic prefix of the fixed length. See for example the format of data shown at 2-1 in FIG. 2. Note that zero padding does not need to be used because it introduces overhead and is unnecessary for avoiding ISI between consecutive symbols.

However, if the fixed length for cyclic prefixes is not long enough to avoid ISI between consecutive symbols, then at step 4-3 the transmitter transmits symbols such that each symbol is preceded by a cyclic prefix of the fixed length and the symbol has enough zero tail or zero head to avoid ISI between consecutive symbols. See for example the format of data shown at 2-2 in FIG. 2. Note that zero padding is applied because the cyclic prefixes are not sufficient for avoiding ISI between consecutive symbols. In specific implementations, there is a minimum amount of zero tail so that a length of the zero tail in addition to the fixed length for cyclic prefixes is greater than or equal to the channel delay spread. Additional zero padding is possible, but it would introduce additional overhead and is unnecessary for avoiding ISI between consecutive symbols.

There are many ways in which the transmitter may be aware of the channel delay spread for transmitting the data to the receiver. In some implementations, the transmitter is pre-configured with the channel delay spread. Such pre-configuration may stem from previous measurements taken during deployment of the transmitter or the receiver. In other implementations, the transmitter measures the channel delay spread of a data reception that previously occurred, and due to the reciprocal nature of the directions in a bi-directional communications channel, the transmitter can assume that the channel delay spread for transmitted data is equal to the channel delay spread for received data. Note that the channel delay spread may change for example if the transmitter or the receiver moves, or if there are changes in the surrounding environment. In some implementations, the transmitter determines the channel delay spread for transmitting data to the receiver on an ongoing basis in order to adapt to changes in the channel delay spread. An example of this is described below with reference to FIG. 5.

Figure 5:
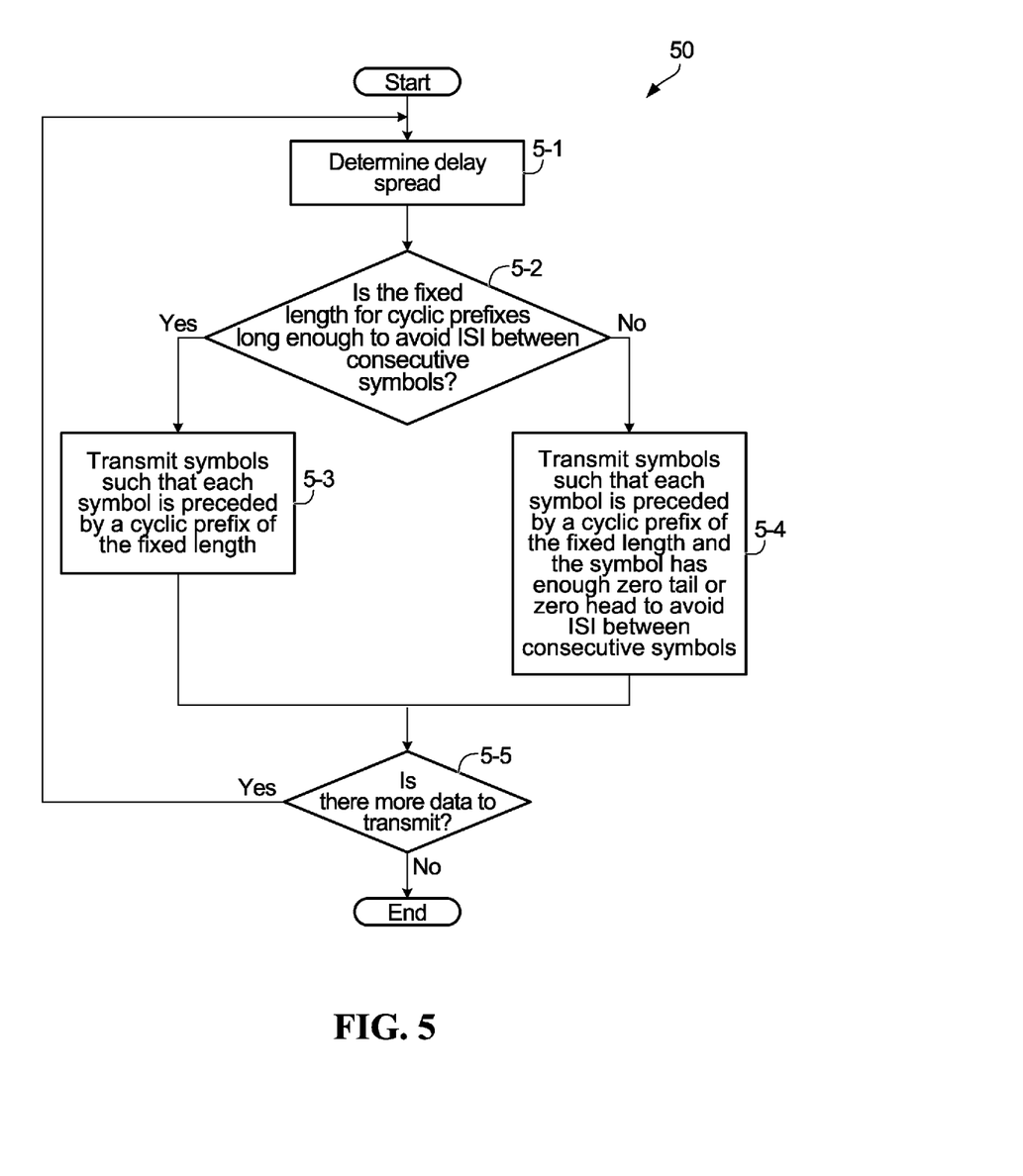
FIG. 5 is a flowchart of a method for transmitting data in a manner that adapts to changes in the channel delay spread, in accordance with an embodiment of the disclosure.

Referring now to FIG. 5, shown is a flowchart of a method for transmitting data in a manner that adapts to changes in the channel delay spread. This method may be implemented by a transmitter, for example by the transmit function 12 of the wireless device 10 shown in FIG. 1. Alternatively, this method may be implemented by a network node (e.g. base station) of a wireless network. More generally, this method may be implemented by any appropriate transmitter.

At step 5-1, the transmitter determines a channel delay spread for transmitting data to a receiver. In some implementations, this is accomplished based on pre-configurations as explained above, based on measurement of receive signals as explained above, or a combination thereof. The transmitter then transmits data in a manner that accounts for the channel delay spread at steps 5-2 through 5-4. These steps are similar to steps 4-1 through 4-3 described above with reference to FIG. 4 and so their description is not repeated here.

As noted above, the channel delay spread may change for example if the transmitter or the receiver moves, or if there are changes in the surrounding environment. Therefore, in some implementations, if at step 5-5 there is more data to transmit, then the method loops back to step 5-1 so that the channel delay spread can be determined on an ongoing basis. Thus, the transmitter can adapt transmission of data at steps 5-3 and 5-4 according to changes in the channel delay spread. For example, the transmitter can apply a minimum amount of zero tail for each iteration of the method to avoid ISI between consecutive symbols. The minimum amount of zero tail can for example include no zero tail (i.e. transmission at step 5-3) when the channel delay spread is small enough to permit this case, or some zero tail (i.e. transmission at step 5-4) when the channel delay spread is larger than the fixed length for cyclic prefixes. In some implementations, when changing the amount of zero tail or zero head, the change is communicated to the receiver in advance of the change to facilitate the receiver to recover the data.

Multiple Simultaneous Transmissions

Although the examples described above focus on a transmitter with one transmission at a time, it is to be understood that embodiments of the disclosure are applicable to multiple simultaneous transmissions. Multiple simultaneous transmissions from a transmitter are possible using different frequency sub-bands as described below with reference to FIGS. 6 and 7.

Figure 6:
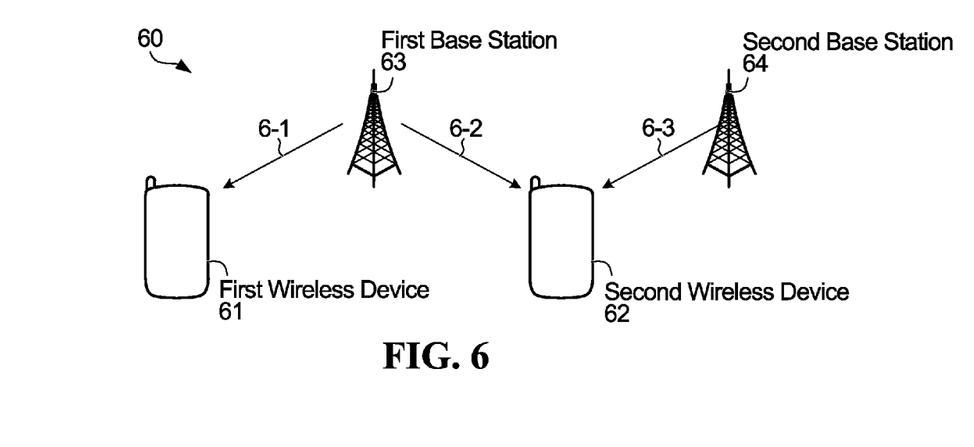
FIG. 6 is a schematic of a wireless system featuring multiple simultaneous transmissions, in accordance with an embodiment of the disclosure.

Referring now to FIG. 6, shown is a schematic of a wireless system 60 featuring multiple simultaneous transmissions. The wireless system 60 has a first base station 63, a second base station 64, and may have other base stations and other network components that are not specifically shown. The wireless system 60 also has a first wireless device 61, a second wireless device 62, and may have other wireless devices that are not specifically shown.

Figure 7:
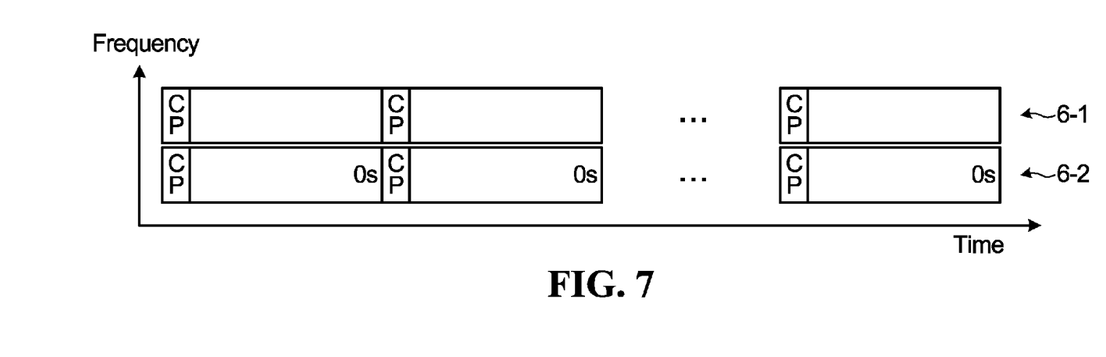
FIG. 7 is a schematic representing multiple simultaneous transmissions, in accordance with an embodiment of the disclosure.

Operation of the wireless system 60 will now be described by way of example. The first base station 63 transmits data to the first wireless device 61 as shown at 6-1, and transmits data to the second wireless device 62 as shown at 6-2. As shown in FIG. 7, these multiple transmissions occur at the same time, but at different frequencies.

In this example, the first data transmission as shown at 6-1 has cyclic prefixes and symbols without any zero tail or zero head because the fixed length of the cyclic prefixes is longer than the channel delay spread for transmitting data to the first wireless device 61. In contrast, the second data transmission as shown at 6-2 has both cyclic prefixes and zero tail because the fixed length of the cyclic prefixes is shorter than the channel delay spread for transmitting data to the second wireless device 62. Note that the channel delay spread for transmitting data to the second wireless device 62, in this particular example, is greater than the channel delay spread for transmitting data to the first wireless device 61 due to the different locations of the wireless devices 61, 62, and the data transmission as shown at 6-2 accounts for this by using zero tail. Notwithstanding this, both transmissions have the same symbol length. Also, both transmissions may be aligned for greater interference cancellation. In particular, since both transmissions have the same symbol length, they may be synchronized in time, and they have the same sub-carrier spacing.

Note that some receivers may support CoMP (Coordinated Multipoint) and receive the same transmission from more than one transmitter. For example, as shown in the illustrated example, the second wireless device 62 receives the second transmission as shown at 6-2 and a third transmission from a second base station 64 as shown at 6-3. These two transmissions share the same data and the same zero tail as shown in FIG. 7 at 6-2. The amount for zero tail for these two transmissions may be designed for a composite channel delay spread so that ISI may be avoided for both transmissions. This may involve some coordination among the base stations 63, 64 transmitting data to the second wireless device 62 to determine a composite channel delay spread. The composite channel delay spread depends on various factors such as the respective distances between the base stations 63, 64 and the second wireless device 62.

Some receivers may not support CoMP and may receive transmissions from only one transmitter at a time. For example, as shown in the illustrated example, the first wireless device 61 receives only the first transmission from the first base station 63 as shown at 6-1. In this scenario, there may be no need for coordination among the base stations 63, 64.

Wireless Technologies

Embodiments of the disclosure are applicable to many possible wireless technologies. One possible wireless technology is DFT-s-OFDM (Discrete Fourier Transform spread Orthogonal Frequency-Division Multiplexing), which is also known as SC-FDMA (Single Carrier Frequency-Division Multiple Access). For DFT-s-OFDM implementations, each symbol that is transmitted is an OFDM symbol. Single carrier based technologies such as IEEE (Institute of Electrical and Electronics Engineers) 802.1 lad are also possible. For IEEE 802.11ad implementations, each symbol that is transmitted is a sequence of modulated data, and each cyclic prefix is a pilot symbol as described in further detail below. Other wireless technologies are possible and are within the scope of this disclosure. More generally, embodiments of the disclosure are applicable to any suitable single carrier based technology.

Figure 8:
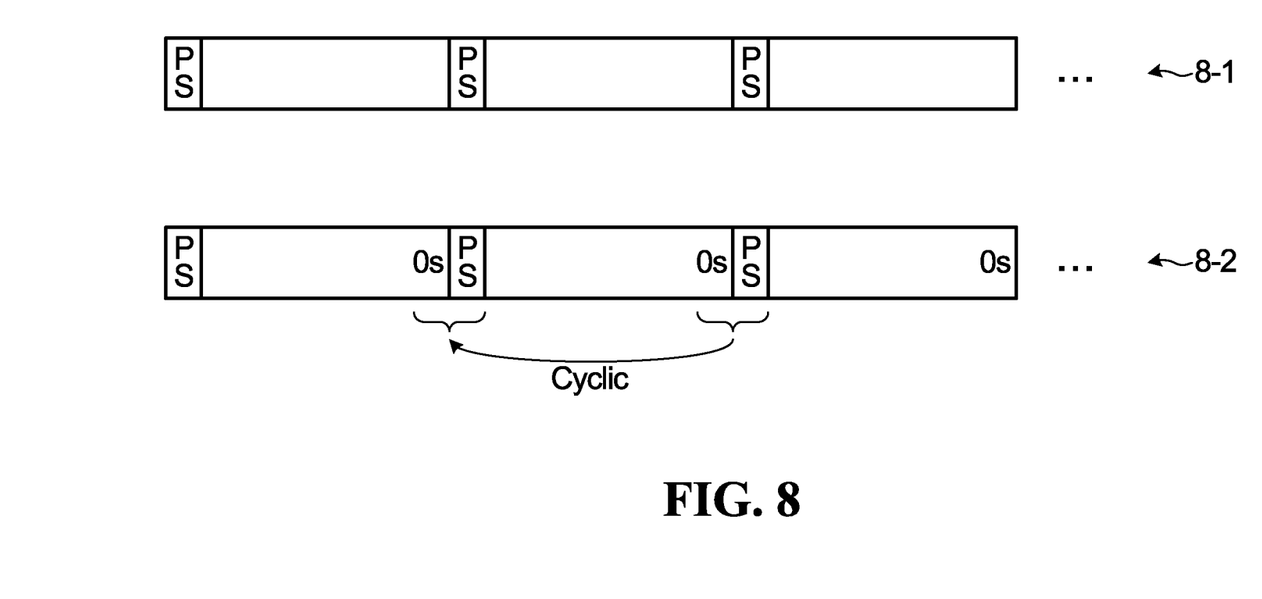
FIG. 8 is a schematic representing other formats of data that may be transmitted by the wireless device of FIG. 1.

It is to be understood that embodiments of the disclosure are applicable to wireless technologies that utilize cyclic prefixes but do not refer to them as being cyclic prefixes. An example of this is IEEE 802.11ad, which is described to utilize "pilot symbols" as cyclic prefixes. In order to illustrate this point, reference is made to FIG. 8, which is a schematic representing other formats of data that may be transmitted by the wireless device 10 of FIG. 1 for the case of IEEE 802.11ad. The first format of data shown at 8-1 of FIG. 8 corresponds to the first format of data shown at 2-1 of FIG. 2, except that the first format of data shown at 8-1 of FIG. 8 uses "pilot symbols" as cyclic prefixes. Likewise, the second format of data shown at 8-2 of FIG. 8 corresponds to the second format of data shown at 2-2 of FIG. 2, except that the second format of data shown at 8-2 of FIG. 8 uses "pilot symbols" as cyclic prefixes. Each "pilot symbol" for a data symbol is cyclic in the sense that it repeats from one symbol to the next as shown in FIG. 8, and prefixes the data symbol. Thus, for the purpose of this disclosure, the term "cyclic prefix" is considered to cover "pilot symbol" or any other cyclic prefix that may be referred to using other terminology.

As noted above for FIG. 1, the circuitry implementing the transmit function 12 of the wireless device 10 may include any appropriate combination of hardware, software and firmware. However, the manner in which the transmit function 12 is implemented may depend on the wireless technology that is utilized. Example components of a transmit function are described below with reference to FIG. 9 for a case of DFT-s-OFDM.

Figure 9:
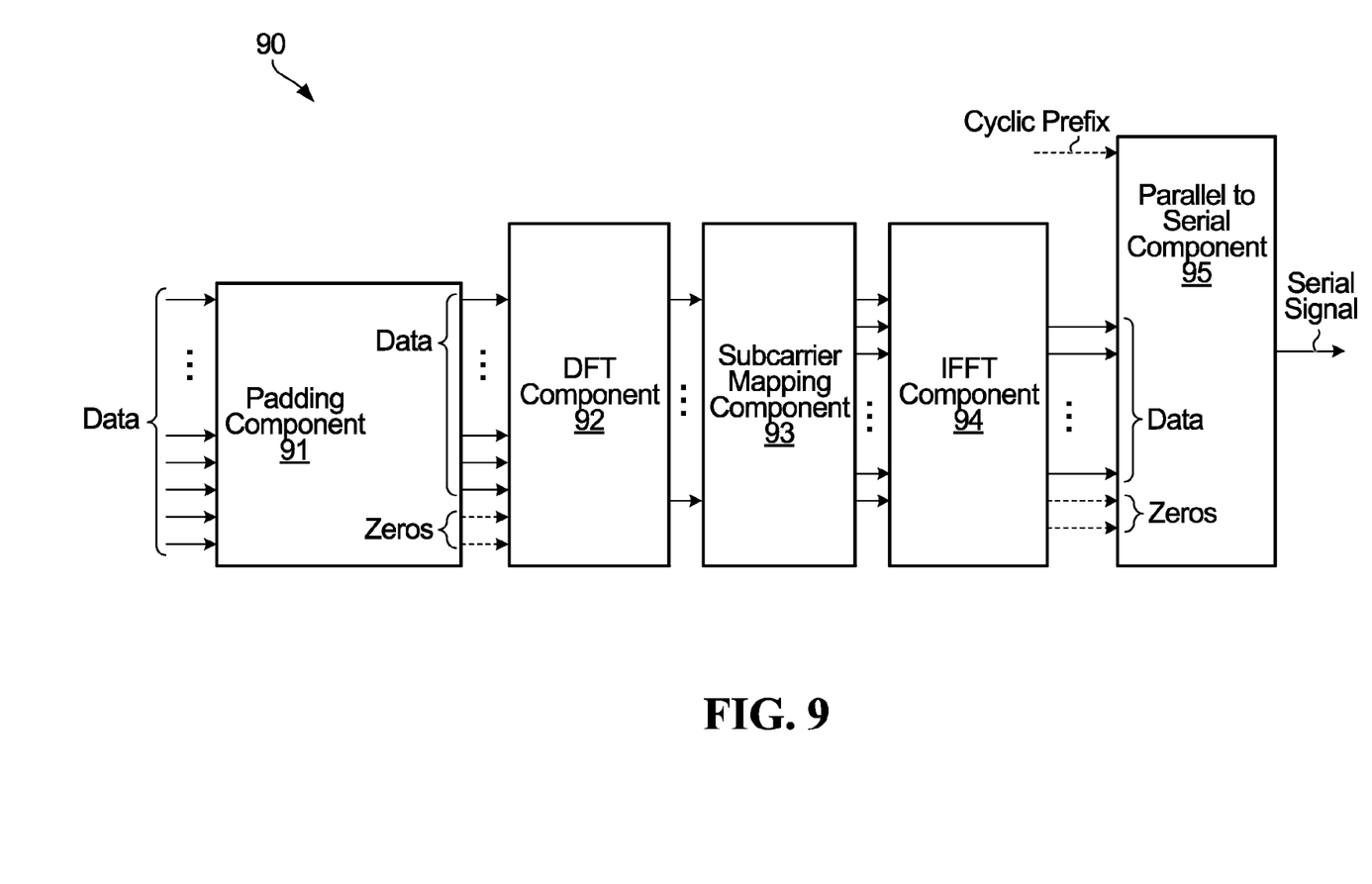
FIG. 9 is a schematic showing example components that may be implemented in a transmit function, in accordance with an embodiment of the disclosure.

Referring now to FIG. 9, shown is a schematic showing example components 90 that may be implemented in a transmit function in the case of DFT-s-OFDM. It is to be understood that components 90 may form part of a transmit function of a wireless device or a network node (e.g. base station) of a wireless network. The components 90 include a padding component 91, a DFT (Discrete Fourier Transform) component 92, a subcarrier mapping component 93, an IFFT (Inverse Fast Fourier Transform) component 94, a parallel to serial component 95, and may include other components that are not specifically shown. It is to be understood that the components 90 are very specific for exemplary purposes only.

Operation of the components 90 will now be described by way of example. The padding component 91 conditionally pads a stream of data symbols with a zero tail or zero head length that is determined in accordance with an estimated channel delay spread to mitigate ISI between consecutive OFDM symbols to be transmitted. In the case of zero padding, the stream of data symbols includes one or more zeros, which are time slots with no data symbol. Note that the total OFDM duration remains fixed regardless of the zero padding performed. Before the data that has been conditionally padded is transmitted, the data is mapped in the frequency domain to a frequency sub-band. To this end, the DFT component 92 transforms the data from a time domain into a frequency domain so that the subcarrier mapping component 93 can map the data in the frequency domain to the frequency sub-band. The IFFT component 94 then transforms the data back from the frequency domain to the time domain prior to the parallel to serial component 95 performing conversion into a serial signal for transmission over a communication channel. Note that the cyclic prefix is fed into the serial signal by the parallel to serial component 95 along with the data and zero padding.

The serial signal includes OFDM symbols, where each OFDM symbol is preceded by a cyclic prefix and the OFDM symbol has enough zero padding to avoid ISI between consecutive OFDM symbols. As previously noted for FIG. 2, the length of zero padding for a transmitted symbol is a time value (i.e. measured in seconds). In this case, the length of zero padding for the OFDM symbols have discrete time values based on how many zeros are present. In particular, for each OFDM symbol, the padding component 91 determines how many zeros there will be in the stream of data symbols used to generate the OFDM symbol. Since the number of zeros (i.e. number of time slots with no data symbol) is a whole number, the OFDM symbols, which are derived from streams of data symbols, have discrete time values based on the number of zeros.

Figure 10:
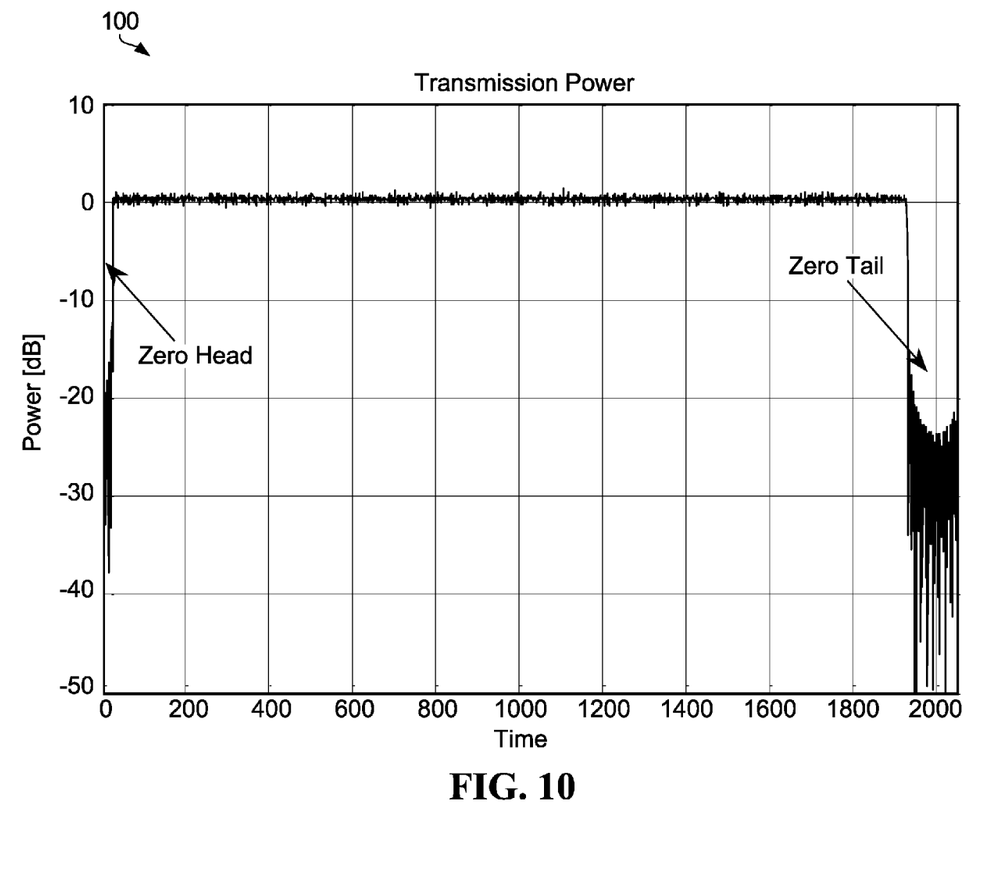
FIG. 10 is a graph showing transmission power of a transmitter.

Note that the zero padding, whether zero tail or zero head, when transmitted provides for low transmission power, but such low transmission power may not be zero. To illustrate this point, reference is made to FIG. 10, which is a graph 100 showing transmission power of a transmitter for DFT-s-OFDM. The graph 100 shows that transmission power for zero tail and zero head is significantly reduced, but not actually zero. However, for single carrier systems such as IEEE 802.1 lad, true zeros may be used. In any event, the terms "zero padding," "zero tail" and "zero head" as used throughout this disclosure are not to be interpreted to necessarily require zero transmission power.

Another Method for Mitigating ISI

Figure 11:
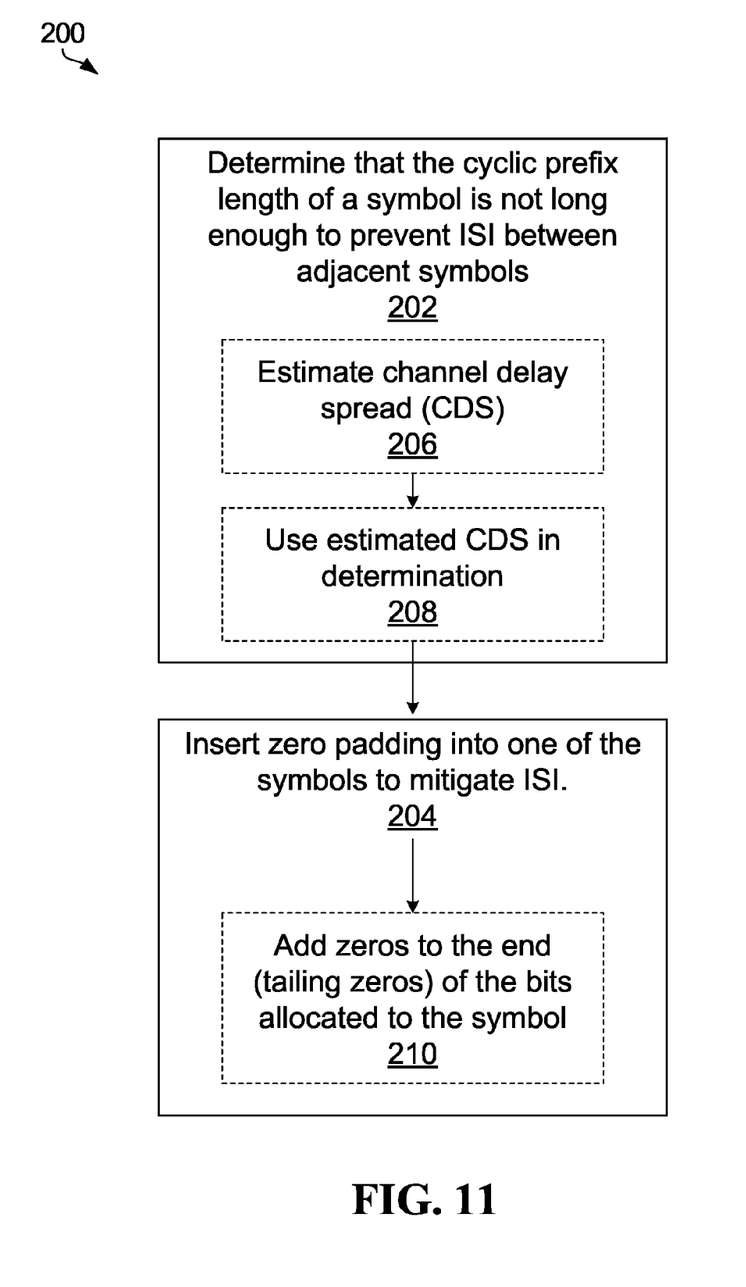
FIG. 11 is a flowchart illustrating a method of mitigating ISI.

Referring now to FIG. 11, shown is another method 200 for mitigating ISI. This method may be implemented by a transmitter, for example by a transmit function of a wireless device. Alternatively, this method may be implemented by a network node (e.g. base station) of a wireless network. More generally, this method may be implemented by any appropriate transmitter.

In step 202, a determination is made that the length of the cyclic prefix of a symbol is insufficiently long to prevent ISI between adjacent symbols. In step 204, zero padding is inserted into the symbol itself to mitigate the effects of ISI. In some embodiments, step 202 can include using a channel delay spread value in the determination. The channel delay spread can be estimated in step 206, and the determination of step 202 can be done in accordance with the estimated channel delay spread in step 208. To provide for the zero padding in step 204, in step 210 zeros can be added to the end of the symbol (i.e. zero tail). One skilled in the art will appreciate that zero headers can be used in place or, or in addition to the zero tail.

In some embodiments, the zero padding is provided for each symbol of a transmission. An example of this has been described above with reference to FIG. 2. However, it is to be understood that embodiments in which only a subset of the symbols have zero padding are possible. An example of this will be described below with reference to FIG. 12.

Figure 12:
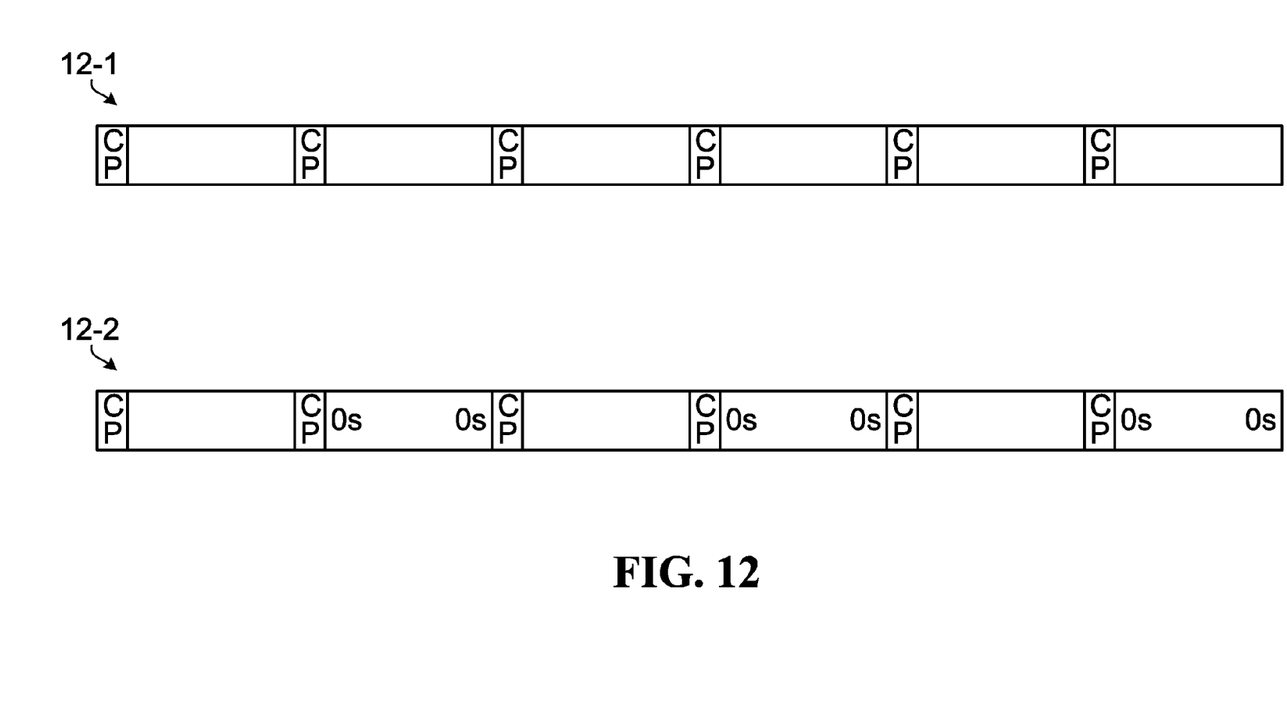
FIG. 12 is a schematic representing other formats of data for mitigating ISI.

Referring now to FIG. 12, shown is a schematic representing other formats of data for mitigating ISI. As shown at 12-1, a transmitter may transmit symbols such that each symbol is preceded by a cyclic prefix as similarly described above with reference to FIG. 2. However, if the channel delay spread is greater than the length of the cyclic prefixes, then the transmitter may pad the symbols with zeros as shown at 12-2. In this example, the zero padding includes both zero tail and zero head for every other symbol (e.g. symbols 2, 4, 6, 8, . . . ) while remaining symbols have no zero padding at all. Note that ISI can be mitigated using the cyclic prefixes and zero padding even though half of the symbols have no zero padding at all.

The format of data shown at 12-2 is irregular in the sense that data payload differs from symbol to symbol. In particular, the symbols having the zero padding have smaller payload than the symbols having no zero padding. Note that other irregular formats of data that combine cyclic prefixes and zero padding are possible. For example, with respect to the format of data shown at 12-2, any one of the symbols having both zero tail and zero head could alternatively have only zero head provided that the subsequent symbol has zero head instead of no zero padding. Various combinations of zero tail and zero head are possible such that ISI can be mitigated. In general, zero padding may be inserted into at least some of the symbols to mitigate the ISI.

As a further example, with reference back to FIG. 2, although zero tail is used for each symbol at 2-2, in alternative implementations, zero tail is omitted from the last symbol of the transmission. This is because the zero tail of the last symbol of the transmission is not actually needed to mitigate ISI.

In some embodiments, the symbols have a fixed length, and the cyclic prefixes also have a fixed length. Examples of this have been described above. However, other embodiments are possible in which irregular symbol lengths and/or irregular cyclic prefix lengths are possible.

Computer Readable Medium

In accordance with another embodiment of the disclosure, there is provided a non-transitory computer readable medium having computer executable instructions stored thereon for execution on a processor of a transmitter so as to implement any of the methods described herein. The non-transitory computer readable medium might for example be an optical disk such as a CD (Compact Disc), a DVD (Digital Video Disc), or a BD (Blu-Ray Disc). Alternatively, the non-transitory computer readable medium might for example be a memory stick, a memory card, a disk drive, a solid state drive, etc. Other non-transitory computer readable media are possible and are within the scope of this disclosure. More generally, the non-transitory computer readable medium can be any tangible medium in which the computer executable instructions can be stored.

Numerous modifications and variations of the present disclosure are possible in light of the above teachings. It is therefore to be understood that within the scope of the appended claims, the disclosure may be practiced otherwise than as specifically described herein.

We claim:

1. A method for single carrier transmission, the method comprising:
    based on a channel delay spread for transmitting data to a receiver, determining whether a fixed length for cyclic prefixes is long enough to avoid Inter-Symbol Interference, ISI, between consecutive symbols;
    upon determining that the fixed length for cyclic prefixes is not long enough to avoid ISI between consecutive symbols, transmitting data to the receiver by transmitting symbols such that each symbol is preceded by a cyclic prefix of the fixed length and the symbol has a fixed length with enough zero padding to avoid ISI between consecutive symbols.

2. The method of claim 1, wherein determining whether the fixed length for cyclic prefixes is long enough to avoid ISI between consecutive symbols comprises:
    determining whether the fixed length for cyclic prefixes is longer than the channel delay spread for transmitting data to the receiver.

3. The method of claim 1, wherein the zero padding comprises zero tail without any zero head.

4. The method of claim 3, wherein the zero tail comprises a minimum amount of zero tail so that a length of the zero tail in addition to the fixed length for cyclic prefixes is greater than or equal to the channel delay spread.

5. The method of claim 4, comprising:
    determining the channel delay spread on an ongoing basis to capture changes to the channel delay spread;
    adapting the minimum amount of zero tail to avoid ISI between consecutive symbols on an ongoing basis according to changes to the channel delay spread; and maintaining a constant symbol length even when adapting the minimum amount of zero tail to avoid ISI between consecutive symbols.

6. The method of claim 4, wherein the receiver is a first receiver to which data is transmitted using a first frequency sub-band, the method further comprising:
transmitting data to a second receiver using a second frequency sub-band;
wherein both transmissions occur simultaneously from a same transmitter and have a same symbol length even if the transmissions have a different amount of zero tail to avoid ISI between consecutive symbols.

7. The method of claim 1, wherein:
transmitting data comprises transmitting data using Discrete Fourier Transform spread Orthogonal Frequency-Division Multiplexing, DFT-s-OFDM;
each symbol that is transmitted is an Orthogonal Frequency-Division Multiplexing, OFDM, symbol; and
each cyclic prefix is a repetition of an end portion of an OFDM symbol.

8. The method of claim 7, comprising, for a given OFDM symbol period:
processing N inputs with a Discrete Fourier Transform, DFT, where N is a fixed DFT size;
performing subcarrier mapping on an output of the DFT;
processing an output of the subcarrier mapping with an Inverse Fast Fourier Transform, IFFT;
performing parallel to serial conversion on an output of the IFFT, and applying the cyclic prefix;
wherein when it is determined that the cyclic prefix is long enough to avoid ISI, the N inputs are N data symbols, and when it is determined that the cyclic prefix is not long enough to avoid ISI, the N inputs include N-M data symbols and M zeros, where M represents an amount of zero padding.

9. The method of claim 1, wherein:
transmitting data comprises transmitting data using Institute of Electrical and Electronics Engineers, IEEE, 802.11ad;
each symbol that is transmitted is a sequence of modulated data; and
each cyclic prefix is a pilot symbol that repeats from one symbol to the next.

10. The method of claim 1, wherein the method is executed by a wireless device.

11. The method of claim 1, wherein each cyclic prefix is a repetition of an end portion of a symbol.

12. The method of claim 1, wherein each cyclic prefix is a pilot symbol that repeats from one symbol to the next.

13. A non-transitory computer-readable medium having recorded thereon instructions that when executed by a processor implement a method for single carrier transmission, the method comprising:
based on a channel delay spread for transmitting data to a receiver, determining whether a fixed length for cyclic prefixes is long enough to avoid Inter-Symbol Interference, ISI, between consecutive symbols;
upon determining that the fixed length for cyclic prefixes is not long enough to avoid ISI between consecutive symbols, transmitting data to the receiver by transmitting symbols such that each symbol is preceded by a cyclic prefix of the fixed length and the symbol has a fixed length with enough zero padding to avoid ISI between consecutive symbols.

14. A transmitter comprising:
a wireless access radio; and
circuitry implementing a transmit function with the wireless access radio for single carrier transmission and being configured to:
based on a channel delay spread for transmitting data to a receiver, determine whether a fixed length for cyclic prefixes is long enough to avoid Inter-Symbol Interference, ISI, between consecutive symbols;
upon determining that the fixed length for cyclic prefixes is not long enough to avoid ISI between consecutive symbols, transmit data to the receiver by transmitting symbols such that each symbol is preceded by a cyclic prefix of the fixed length and the symbol has a fixed length with enough zero padding to avoid ISI between consecutive symbols.

15. The transmitter of claim 14, wherein:
the circuitry comprises a processor; and
the transmitter further comprises a computer-readable medium having recorded thereon instructions that when executed by the processor configure the processor to implement the transmit function.

16. The transmitter of claim 14, wherein:
the circuitry is configured to transmit data using Discrete Fourier Transform spread Orthogonal Frequency-Division Multiplexing, DFT-s-OFDM; and
each symbol that is transmitted is an Orthogonal Frequency-Division Multiplexing, OFDM, symbol; and
each cyclic prefix is a repetition of an end portion of an OFDM symbol.

17. The transmitter of claim 16, wherein the circuitry comprises:
a padding component configured to pad a stream of data symbols with an amount of zero padding determined in accordance with an estimated channel delay spread to avoid ISI between consecutive OFDM symbols to be transmitted;
a Discrete Fourier Transform, DFT, component configured to transform the data that has been padded from a time domain into a frequency domain;
a subcarrier mapping component configured to map the data in the frequency domain to a frequency sub-band;
an Inverse Fast Fourier Transform, IFFT, component configured to transform the data back from the frequency domain to the time domain; and
a parallel to serial component configured to convert the data in the time domain into a serial signal and append the cyclic prefix therein prior to transmission;
wherein the serial signal comprises OFDM symbols such that each OFDM symbol is preceded by a cyclic prefix and the OFDM symbol has enough zero padding to avoid ISI between consecutive OFDM symbols;
wherein, for a given OFDM symbol period, the DFT component accepts N inputs, where N is a fixed DFT size;
wherein when it is determined that the cyclic prefix is long enough to avoid ISI, the N inputs are N data symbols, and when it is determined that the cyclic prefix is not long enough to avoid ISI, the N inputs include N-M data symbols and M zeros, where M represents an amount of zero padding.

18. The transmitter of claim 14, wherein the circuitry is configured to determine whether the fixed length for cyclic prefixes is long enough to avoid ISI between consecutive symbols by:
determining whether the fixed length for cyclic prefixes is longer than the channel delay spread for transmitting data to the receiver.

19. The transmitter of claim 14, wherein the zero padding comprises zero tail without any zero head.

20. The transmitter of claim 19, wherein the zero tail comprises a minimum amount of zero tail so that a length of the zero tail in addition to the fixed length for cyclic prefixes is greater than or equal to the channel delay spread.

21. The transmitter of claim 20, wherein:
the circuitry is configured to determine the channel delay spread on an ongoing basis to capture changes to the channel delay spread;
the circuitry is configured to adapt the minimum amount of zero tail to avoid ISI between consecutive symbols on an ongoing basis according to changes to the channel delay spread; and
the circuitry is configured to maintain constant symbol length even when the circuitry adapts the minimum amount of zero tail to avoid ISI between consecutive symbols.

22. The transmitter of claim 20, wherein the receiver is a first receiver to which first data is transmitted using a first frequency sub-band, the circuitry being further configured to:
simultaneously transmit second data to a second receiver using a second frequency sub-band;
wherein both transmissions have a same symbol length even if the transmissions have a different amount of zero tail to avoid ISI between consecutive symbols.

23. The transmitter of claim 14, wherein:
the circuitry is configured to transmit data using Institute of Electrical and Electronics Engineers, IEEE, 802.11ad;
each symbol is that is transmitted is a sequence of modulated data; and
each cyclic prefix is a pilot symbol that repeats from one symbol to the next.

24. The transmitter of claim 14, wherein the transmitter is a wireless device.

25. The transmitter of claim 14, wherein each cyclic prefix is a repetition of an end portion of a symbol.

26. The transmitter of claim 14, wherein each cyclic prefix is a pilot symbol that repeats from one symbol to the next.

27. A method for transmitting data to a receiver over a channel, the method comprising:
determining that a cyclic prefix length associated with symbols in a transmission is insufficiently long to prevent Inter-Symbol Interference, ISI, between adjacent symbols; and
responsive to the determination, inserting zero padding into one of the symbols to mitigate the ISI.

28. The method of claim 27 wherein the step of determining that a cyclic prefix length is insufficiently long includes determining that the cyclic prefix length is insufficiently long in accordance with a channel delay spread.

29. The method of claim 28 wherein the step of determining includes obtaining an estimate of the channel delay spread.

30. The method of claim 27 wherein the step of inserting zero padding includes inserting zero tail into a fixed length symbol.

31. The method of claim 30 wherein the step of inserting zero padding further includes inserting zero head into the fixed length symbol.

32. The method of claim 27, wherein the cyclic prefix length is fixed.

33. The method of claim 27 wherein the step of inserting zero padding includes inserting zero padding into a plurality of the symbols in the transmission.

34. The method of claim 27, wherein each cyclic prefix is a repetition of an end portion of a symbol.

35. The method of claim 27, wherein each cyclic prefix is a pilot symbol that repeats from one symbol to the next.

* * * * *